United States Patent
Sato et al.

(10) Patent No.: US 11,400,876 B2
(45) Date of Patent: Aug. 2, 2022

(54) SENSOR INFORMATION OUTPUT APPARATUS AND VEHICLE CONTROL APPARATUS

(71) Applicant: JTEKT CORPORATION, Osaka (JP)

(72) Inventors: Yuma Sato, Chiryu (JP); Masato Oda, Okazaki (JP); Kenichi Kozuka, Chita (JP)

(73) Assignee: JTEKT CORPORATION, Kariya (JP)

( * ) Notice: Subject to any disclaimer, the term of this patent is extended or adjusted under 35 U.S.C. 154(b) by 386 days.

(21) Appl. No.: 16/681,967

(22) Filed: Nov. 13, 2019

(65) Prior Publication Data

US 2020/0156569 A1 May 21, 2020

(30) Foreign Application Priority Data

Nov. 15, 2018 (JP) .............................. JP2018-214333

(51) Int. Cl.
  *B60R 16/023* (2006.01)
  *G05B 19/042* (2006.01)
  *B60R 21/013* (2006.01)

(52) U.S. Cl.
  CPC ...... *B60R 16/0231* (2013.01); *G05B 19/0423* (2013.01); *B60R 21/013* (2013.01)

(58) Field of Classification Search
  CPC . B60R 16/0231; B60R 21/013; B60R 16/023; B60R 2021/01286; G05B 19/0423; G01L 25/003; G01D 3/08; B62D 6/10; B62D 5/0463
  USPC .......................................................... 701/36
  See application file for complete search history.

(56) References Cited

U.S. PATENT DOCUMENTS

| 5,291,578 A * | 3/1994 | Kalami ................... F02D 41/22 123/497 |
| 6,940,290 B2 | 9/2005 | Ishida |
| 8,887,022 B2 * | 11/2014 | Hammerschmidt .. H04L 1/0061 714/758 |
| 9,112,738 B2 * | 8/2015 | Szuecs .................... B60R 21/00 |

(Continued)

FOREIGN PATENT DOCUMENTS

| EP | 3225957 A2 | 10/2017 |
| JP | 2017-187316 A | 10/2017 |
| JP | 2017196991 A * | 11/2017 |

OTHER PUBLICATIONS

"PSI5 Peripheral Sensor Interface for Automotive Applications V1.2;" Technical Specificaiton, V1.2, Jun. 14, 2007, pp. 1-36.

(Continued)

*Primary Examiner* — B M M Hannan
(74) *Attorney, Agent, or Firm* — Oliff PLC

(57) ABSTRACT

A sensor information output apparatus includes a plurality of first power supply circuits, a single second power supply circuit, and a plurality of receivers. The first power supply circuits are configured to generate operating voltages of digital sensors of a plurality of systems. The number of the first power supply circuits is equal to the number of the plurality of systems. The second power supply circuit is configured to generate a signal voltage for synchronizing signals. The receivers are configured to supply the digital sensors with the synchronizing signals including the operating voltages and the signal voltage. The number of the receivers is equal to the number of the plurality of systems. The digital sensors are configured to supply the electric signals to an external circuit as sensor information.

4 Claims, 3 Drawing Sheets

(56) References Cited

U.S. PATENT DOCUMENTS

| | | | |
|---|---|---|---|
| 11,143,782 B2* | 10/2021 | Zhou | G01R 33/3621 |
| 11,186,243 B2* | 11/2021 | Oesterle | B60W 30/0953 |
| 2002/0060892 A1* | 5/2002 | Swart | H04L 12/4135 |
| | | | 361/86 |
| 2007/0252744 A1* | 11/2007 | Takeuchi | H03M 1/1076 |
| | | | 341/155 |
| 2009/0316320 A1* | 12/2009 | Maeda | B60R 16/03 |
| | | | 361/92 |
| 2010/0191424 A1* | 7/2010 | Wellhoefer | B60R 21/0132 |
| | | | 701/45 |
| 2013/0033357 A1* | 2/2013 | Hammerschmidt | |
| | | | G05B 19/0423 |
| | | | 340/3.1 |
| 2013/0253774 A1* | 9/2013 | Hammerschmidt | |
| | | | B60W 50/0205 |
| | | | 701/45 |
| 2014/0301432 A1* | 10/2014 | Szuecs | G06F 13/4072 |
| | | | 375/220 |
| 2014/0358377 A1* | 12/2014 | Hammerschmidt | B60R 21/01 |
| | | | 701/45 |
| 2015/0030111 A1* | 1/2015 | Nitsche | H04L 7/0091 |
| | | | 375/354 |
| 2015/0321629 A1* | 11/2015 | Siemss | H04L 7/06 |
| | | | 307/9.1 |
| 2016/0355211 A1 | 12/2016 | Suzuki et al. | |
| 2017/0050588 A1* | 2/2017 | Hammerschmidt | G07C 5/02 |
| 2017/0282816 A1 | 10/2017 | Kozuka | |
| 2020/0014325 A1* | 1/2020 | Mikawa | H02P 6/14 |
| 2020/0156569 A1* | 5/2020 | Sato | B60R 16/0231 |
| 2020/0264012 A1* | 8/2020 | Haug | H04L 7/0012 |
| 2020/0304172 A1* | 9/2020 | Yano | H04B 3/544 |

OTHER PUBLICATIONS

Mar. 23, 2020 Search Report issued in European Patent Application No. 19208843.3.

* cited by examiner

FIG. 3
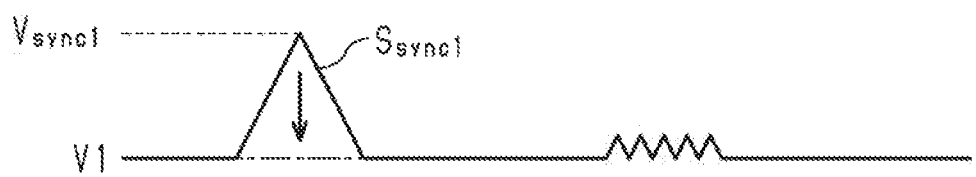
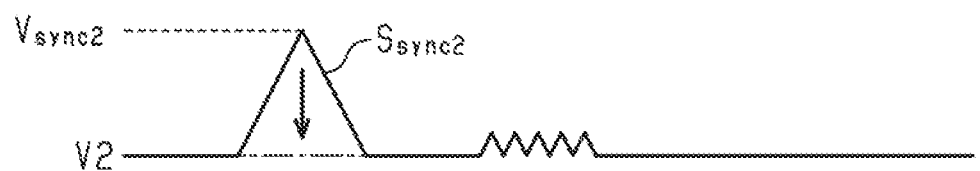

SENSOR INFORMATION OUTPUT APPARATUS AND VEHICLE CONTROL APPARATUS

INCORPORATION BY REFERENCE

The disclosure of Japanese Patent Application No. 2018-214333 filed on Nov. 15, 2018 including the specification, drawings and abstract is incorporated herein by reference in its entirety.

BACKGROUND

1. Technical Field

The present disclosure relates to a sensor information output apparatus and a vehicle control apparatus.

2. Description of Related Art

As described in, for example, Japanese Unexamined Patent Application Publication No. 2017-187316 (JP 2017-187316 A), there is known a sensor apparatus including a sensor and a control apparatus. The control apparatus includes an interface circuit and a central processing unit (CPU). The interface circuit transfers a detection result (electric signal) from the sensor to the CPU. The CPU calculates a physical amount of a detection target of the sensor based on the detection result acquired from the sensor through the interface circuit, and controls a control target based on the calculated physical amount of the detection target.

Peripheral Sensor Interface 5 (PSI5) is employed as a communication standard between the interface circuit and the sensor. The interface circuit supplies an operating voltage to the sensor, and also supplies a voltage synchronizing signal to the sensor. The voltage synchronizing signal is a pulse signal that triggers data communication between the interface circuit and the sensor. The interface circuit includes a first power supply circuit configured to generate the operating voltage of the sensor, and a second power supply circuit configured to generate the voltage synchronizing signal.

SUMMARY

In recent years, there is a demand for redundancy in the sensor and the interface circuit in order to satisfy a reliability requirement level. For example, when a plurality of sensors are provided, it is necessary to provide communication systems and power supply circuits of the interface circuit in conformity with the number of sensor systems. Therefore, the size of the interface circuit may increase (circuit area may increase).

The present disclosure can achieve the redundancy while suppressing the increase in size.

A first aspect of the present disclosure relates to a sensor information output apparatus. The sensor information output apparatus includes a plurality of first power supply circuits, a single second power supply circuit, and a plurality of receivers. The first power supply circuits are configured to generate operating voltages of digital sensors of a plurality of systems. The number of the first power supply circuits is equal to the number of the plurality of systems. The digital sensors are configured to generate electric signals based on a physical amount of a detection target. The second power supply circuit is configured to generate a signal voltage for synchronizing signals. The synchronizing signals are periodically supplied to the digital sensors. The receivers are configured to supply the digital sensors with the synchronizing signals including the operating voltages generated by the first power supply circuits and the signal voltage generated by the second power supply circuit. The number of the receivers is equal to the number of the plurality of systems. The digital sensors are configured to supply the electric signals to an external circuit as sensor information. The electric signals are supplied from the digital sensors in response to the synchronizing signals.

With the configuration described above, even if the first power supply circuit and the receiver are provided with redundancy (provided in a plurality of systems), the same second power supply circuit is shared by the receivers of the plurality of systems. Therefore, the total circuit area of the second power supply circuit can be reduced as compared to the case where separate second power supply circuits are used by the receivers of the plurality of systems. Thus, the size of the sensor information output apparatus can be reduced.

The sensor information output apparatus may further include switches configured to interrupt, when an abnormality occurs in one of transmission lines between the digital sensors and the receivers, supply of the signal voltage to the receiver of a system in which the abnormality occurs.

With the configuration described above, it is possible to reduce the occurrence of a case where the abnormality occurring in the transmission line between the sensor and the receiver of a specific system affects the operation of the sensor of the normal system in some way. Thus, the digital sensor of the normal system can continue the operation.

In the sensor information output apparatus, Peripheral Sensor Interface 5 may be employed as communication standards between the digital sensors and the receivers. When, for example, Peripheral Sensor Interface 5 (PSI5) is employed as the communication standards between the sensors and the receivers as in the configuration described above, two types of voltage circuit (first power supply circuit and second power supply circuit) are necessary. Therefore, it is likely that an increase in the circuit area along with the redundancy is perceived as a problem. Thus, when PSI5 is employed as the communication standards between the sensors and the receivers, it is suitable to employ the configuration of the sensor information output apparatus described above, that is, the configuration in which the same second power supply circuit is shared by the receivers of the plurality of systems.

In the sensor information output apparatus, the first power supply circuits, the second power supply circuit, and the receivers may be integrated into a single integrated circuit chip. Since the components of the sensor information output apparatus (first power supply circuits of the plurality of systems, single second power supply circuit, and receivers of the plurality of systems) are integrated into a single integrated circuit chip as in the configuration described above, the sensor information output apparatus can be made compact in size.

A second aspect of the present disclosure relates to a vehicle control apparatus. The vehicle control apparatus includes a sensor information output apparatus and a control circuit. The sensor information output apparatus includes a plurality of first power supply circuits, a single second power supply circuit, and a plurality of receivers. The first power supply circuits are configured to generate operating voltages of digital sensors of a plurality of systems. The number of the first power supply circuits is equal to the number of the plurality of systems. The digital sensors are configured to generate electric signals based on a physical amount of a detection target. The second power supply circuit is configured to generate a signal voltage for synchronizing signals. The synchronizing signals are periodically supplied to the digital sensors. The receivers are configured to supply the digital sensors with the synchronizing signals including the operating voltages generated by the first power supply circuits and the signal voltage generated by the second power supply circuit. The number of the receivers is equal to the number of the plurality of systems. The digital sensors are configured to supply the electric signals to an external circuit as sensor information. The electric signals are supplied from the digital sensors in response to the synchronizing signals. The control circuit is configured to control, as the external circuit, a control target based on the sensor information acquired through the sensor information output apparatus.

With the configuration described above, the sensor information output apparatus is suited to the vehicle control apparatus. The size of the vehicle control apparatus can be reduced by an amount corresponding to the size reduction of the sensor information output apparatus.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an illustration of a waveform diagram of a synchronizing pulse to be supplied to a first digital torque sensor in an upper part of FIG. 3, and a waveform diagram of a synchronizing pulse to be supplied to a second digital torque sensor in a lower part of FIG. 3.

DETAILED DESCRIPTION OF EMBODIMENTS

Figure 1:
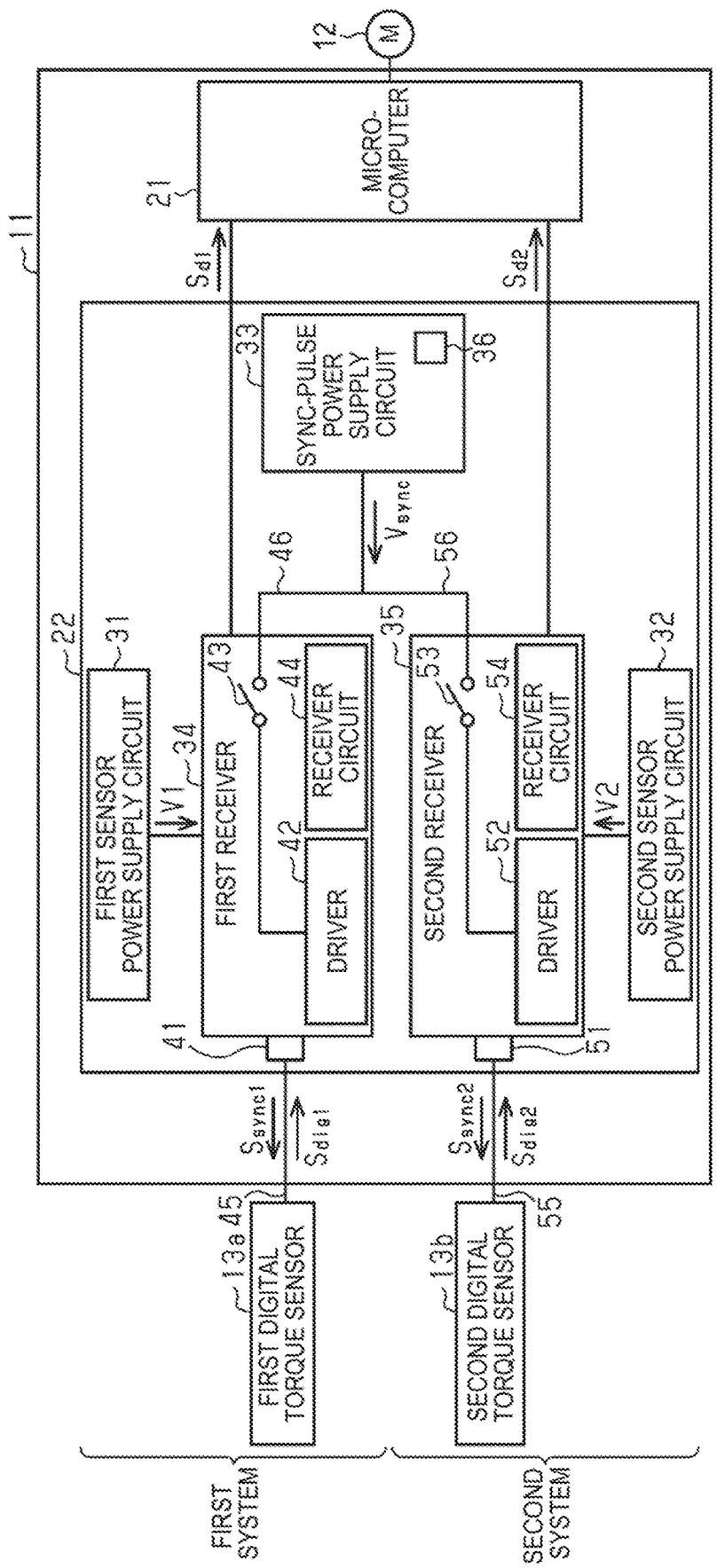
FIG. 1 is a block diagram illustrating a sensor information output apparatus and a vehicle control apparatus according to one embodiment.

Description is given of one embodiment in which a sensor information output apparatus and a vehicle control apparatus including the sensor information output apparatus are applied to an electric power steering system. As illustrated in FIG. 1, an electronic control unit (ECU) 11 serving as the vehicle control apparatus controls a motor 12 that is a control target. The motor 12 generates an assist torque to be applied to a steering mechanism of a vehicle. A first digital torque sensor 13a and a second digital torque sensor 13b are connected to the ECU 11. The first digital torque sensor 13a and the second digital torque sensor 13b detect, as a physical amount of a detection target, a steering torque applied to a steering shaft through an operation for a steering wheel, and generate digital signals $S_{dig1}$ and $S_{dig2}$ as electric signals based on the detected steering torque. The ECU 11 calculates a target assist torque based on at least one of the digital signals $S_{dig1}$ and $S_{dig2}$, and supplies the motor 12 with electric power for generating the calculated target assist torque.

The ECU 11 includes a microcomputer 21 and an interface circuit 22 serving as the sensor information output apparatus. The microcomputer 21 acquires electric signals (detection signals $S_{d1}$ and $S_{d2}$ described later) associated with the digital signals $S_{dig1}$ and $S_{dig2}$ through the interface circuit 22, and calculates a steering torque associated with the digital signal $S_{dig1}$ and a steering torque associated with the digital signal $S_{dig2}$ based on the acquired electric signals. The microcomputer 21 controls power supply to the motor 12 based on at least one of the steering torque associated with the digital signal $S_{dig1}$ and the steering torque associated with the digital signal $S_{dig2}$.

The interface circuit 22 acquires the digital signal $S_{dig1}$ generated by the first digital torque sensor 13a and the digital signal $S_{dig2}$ generated by the second digital torque sensor 13b. Peripheral Sensor Interface 5 (PSI5) is employed as a communication standard between the interface circuit 22 and the first digital torque sensor 13a and as a communication standard between the interface circuit 22 and the second digital torque sensor 13b. Operation modes of PSI5 include an asynchronous mode and a synchronous mode. In this case, the synchronous mode is assumed as a precondition.

The interface circuit 22 includes a plurality of electronic circuits integrated into a single IC chip as an application specific integrated circuit (ASIC). The interface circuit 22 includes a first sensor power supply circuit 31, a second sensor power supply circuit 32, a sync-pulse power supply circuit 33, a first receiver 34, and a second receiver 35. The first sensor power supply circuit 31, the first receiver 34, and the sync-pulse power supply circuit 33 constitute a first system corresponding to the first digital torque sensor 13a. The second sensor power supply circuit 32, the second receiver 35, and the sync-pulse power supply circuit 33 constitute a second system corresponding to the second digital torque sensor 13b. The sync-pulse power supply circuit 33 is a component of the first system, and is also a component of the second system.

The first sensor power supply circuit 31 is connected to a direct current (DC) power supply such as an on-board battery. The first sensor power supply circuit 31 converts a voltage of the DC power supply into an operating voltage V1 suited to the first digital torque sensor 13a. The second sensor power supply circuit 32 is also connected to the DC power supply. The second sensor power supply circuit 32 converts the voltage of the DC power supply into an operating voltage V2 suited to the second digital torque sensor 13b.

The sync-pulse power supply circuit 33 is also connected to the DC power supply. The sync-pulse power supply circuit 33 includes a booster circuit 36 such as a charge pump or a switching regulator configured to boost the voltage of the DC power supply. The sync-pulse power supply circuit 33 generates a voltage $V_{sync}$ for generating a synchronizing pulse (voltage synchronizing signal) $S_{sync1}$ for the first digital torque sensor 13a and a synchronizing pulse $S_{sync2}$ for the second digital torque sensor 13b (signal voltage for the synchronizing pulses $S_{sync1}$ and $S_{sync2}$). The synchronizing pulses $S_{sync1}$ and $S_{sync2}$ are pulse signals that trigger data communication between the first digital torque sensor 13a and the interface circuit 22 and data communication between the second digital torque sensor 13b and the interface circuit 22. The synchronizing pulses $S_{sync1}$ and $S_{sync2}$ have voltages higher than both the operating voltage V1 generated by the first sensor power supply circuit 31 and the operating voltage V2 generated by the second sensor power supply circuit 32.

The first receiver 34 supplies operating power to the first digital torque sensor 13a. Further, the first receiver 34 mediates exchange of electric signals between the first digital torque sensor 13a and the microcomputer 21. The first receiver 34 includes a terminal 41, a driver 42, a switch 43, and a receiver circuit 44.

The terminal 41 is connected to the first digital torque sensor 13a via a transmission line 45. When PSI5 is employed as the communication standard, the transmission line 45 is provided as a twin-core line. The driver 42 supplies the operating voltage V1 generated by the first sensor power supply circuit 31 to the first digital torque sensor 13a via the transmission line 45. The first digital torque sensor 13a operates by being supplied with the operating voltage V1.

The driver 42 is connected to the sync-pulse power supply circuit 33 via a transmission line 46. The transmission line 46 is provided with the switch 43. Examples of the switch 43 to be employed include a semiconductor switch such as a field effect transistor (FET). The switch 43 is normally kept ON. The driver 42 generates the synchronizing pulse $S_{sync1}$ in a predetermined period by using the voltage $V_{sync}$ generated by the sync-pulse power supply circuit 33. The driver 42 supplies the generated synchronizing pulse $S_{sync1}$ to the first digital torque sensor 13a by superimposing the synchronizing pulse $S_{sync1}$ on the voltage on the transmission line 45.

The driver 42 has an abnormality detecting function. For example, the driver 42 detects an overcurrent generated in the transmission line 45 due to a short circuit in the transmission line 45 or the like. When the overcurrent is detected, the driver 42 switches the switch 43 from ON to OFF. Thus, the transmission line 46 is interrupted. That is, the supply of the voltage $V_{sync}$ from the sync-pulse power supply circuit 33 to the driver 42 is interrupted.

When the synchronizing pulse $S_{sync1}$ is received, the first digital torque sensor 13a generates the digital signal $S_{dig1}$ by encoding an electric signal serving as a detection result, and transmits the digital signal $S_{dig1}$ to the first receiver 34 via the transmission line 45. When PSI5 is employed as the communication standard, Manchester coding is employed as an encoding scheme. The digital signal $S_{dig1}$ is transmitted to the first receiver 34 as a pulse superimposed on the voltage on the transmission line 45. The receiver circuit 44 generates the detection signal $S_{d1}$ by decoding the digital signal $S_{dig1}$ received through the transmission line 45, and supplies the generated detection signal $S_{d1}$ to the microcomputer 21.

The second receiver 35 supplies operating power to the second digital torque sensor 13b. Further, the second receiver 35 mediates exchange of electric signals between the second digital torque sensor 13b and the microcomputer 21. The second receiver 35 has the same configuration as that of the first receiver 34. That is, the second receiver 35 includes a terminal 51, a driver 52, a switch 53, and a receiver circuit 54.

The terminal 51 is connected to the second digital torque sensor 13b via a transmission line 55. The driver 52 supplies the operating voltage V2 generated by the second sensor power supply circuit 32 to the second digital torque sensor 13b via the transmission line 55. The driver 52 is connected to the sync-pulse power supply circuit 33 via a transmission line 56. That is, the sync-pulse power supply circuit 33 is shared by the first receiver 34 and the second receiver 35. The transmission line 56 is provided with the switch 53. The switch 53 is normally kept ON. The driver 52 generates the synchronizing pulse $S_{sync2}$ in a predetermined period by using the voltage $V_{sync}$ generated by the sync-pulse power supply circuit 33, and supplies the generated synchronizing pulse $S_{sync2}$ to the second digital torque sensor 13b by superimposing the synchronizing pulse $S_{sync2}$ on the voltage on the transmission line 55. As the abnormality detecting function, the driver 52 has a function of, for example, detecting an overcurrent generated due to a short circuit in the transmission line 55 or the like. When the overcurrent is detected, the driver 52 switches the switch 53 from ON to OFF.

When the synchronizing pulse $S_{sync2}$ is received, the second digital torque sensor 13b generates the digital signal $S_{dig2}$ by encoding an electric signal serving as a detection result, and transmits the digital signal $S_{dig2}$ to the second receiver 35 via the transmission line 55. The receiver circuit 54 generates the detection signal $S_{d2}$ by decoding the digital signal $S_{dig2}$ received through the transmission line 55, and supplies the generated detection signal S to the microcomputer 21.

When the interface circuit 22 is provided with redundancy as the digital torque sensor is provided with redundancy (duplicated in this case), the interface circuit 22 may employ the following configuration.

Figure 2:
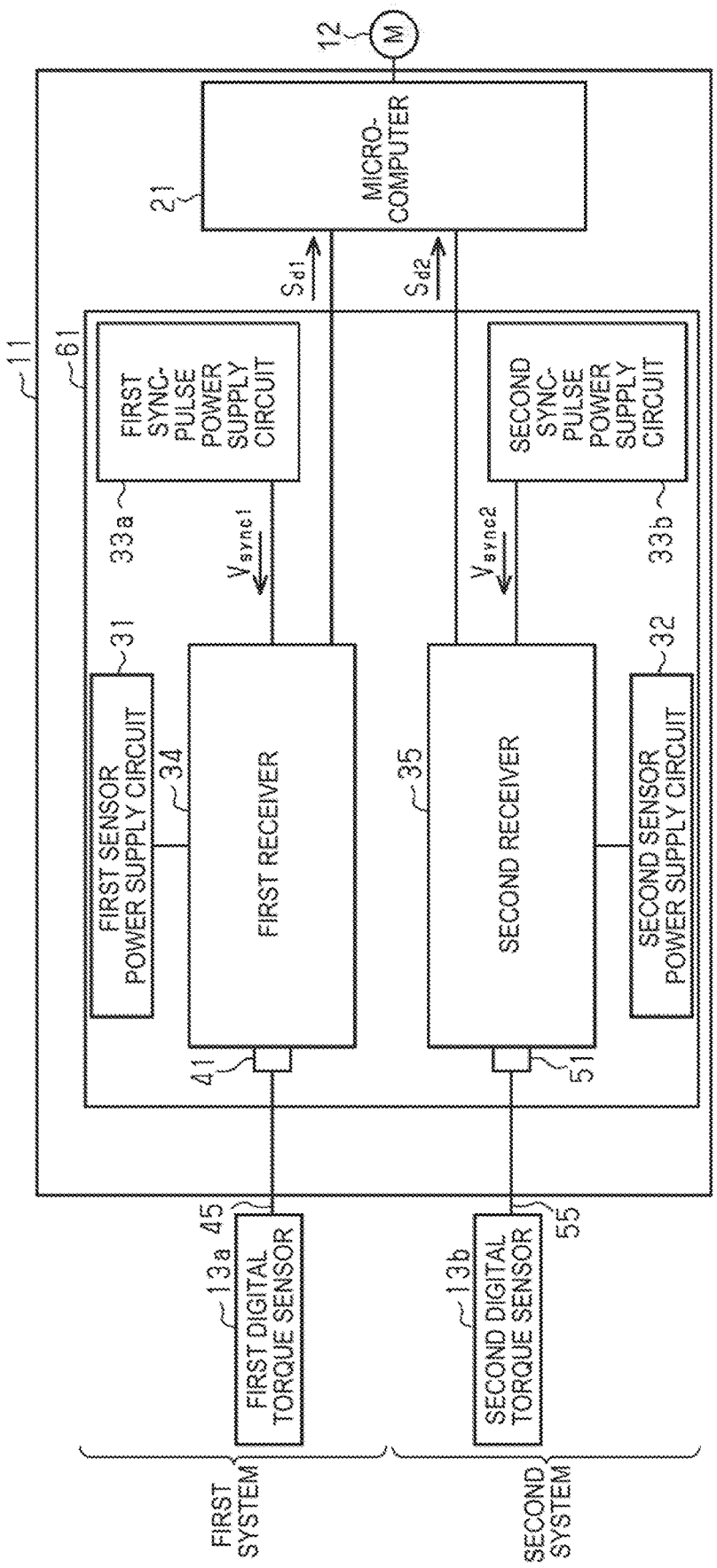
FIG. 2 is a block diagram illustrating a comparative example of the sensor information output apparatus and the vehicle control apparatus.

As illustrated in FIG. 2, an interface circuit 61 of a comparative example includes the first sensor power supply circuit 31, the first receiver 34, and a first sync-pulse power supply circuit 33a as components of the first system corresponding to the first digital torque sensor 13a. The first sync-pulse power supply circuit 33a generates a voltage $V_{sync1}$ for generating the synchronizing pulse $S_{sync1}$ for the first digital torque sensor 13a. The interface circuit 61 includes the second sensor power supply circuit 32, the second receiver 35, and a second sync-pulse power supply circuit 33b as components of the second system corresponding to the second digital torque sensor 13b. The second sync-pulse power supply circuit 33b generates a voltage $V_{sync2}$ for generating the synchronizing pulse $S_{sync2}$ for the second digital torque sensor 13b.

According to this configuration, the redundancy (duplication) of the interface circuit 61 can be achieved undoubtedly, but the size of the interface circuit 61 may increase. This is because all the sensor power supply circuit, the receiver, and the sync-pulse power supply circuit that are components of one system are provided in conformity with the number of systems of the digital torque sensor. For example, in the case of two systems, the size of the interface circuit (circuit area) is at least twice as large as the size in the case of one system.

When PSI5 is employed as the communication standard between the interface circuit and the digital torque sensor, two types of power supply circuit (sensor power supply circuit and sync-pulse power supply circuit) are necessary. Moreover, the die size (chip area) of the sync-pulse power supply circuit is larger than that of the sensor power supply circuit. This is because, for example, the sync-pulse power supply circuit includes the booster circuit. Therefore, when PSI5 is employed as the communication standard, the size of the interface circuit (footprint in the ECU 11) is likely to increase as the redundancy is achieved.

According to this embodiment illustrated in FIG. 1, the sync-pulse power supply circuit 33 is shared by the first receiver 34 and the second receiver 35. Therefore, it is only necessary to provide the single sync-pulse power supply circuit 33 in the interface circuit 22. Thus, the size of the interface circuit 22 can be reduced at least by an amount corresponding to the first sync-pulse power supply circuit 33a or the second sync-pulse power supply circuit 33b in the comparative example illustrated in FIG. 2.

For example, if an overcurrent is generated due to a short circuit in the transmission line 45 of the first system, the driver 42 switches the switch 43 from ON to OFF. Since the transmission line 46 is interrupted, the supply of the voltage $V_{sync}$ from the sync-pulse power supply circuit 33 to the driver 42 is stopped. Thus, it is possible to reduce the occurrence of a case where the abnormality occurring in the first system (short circuit in the transmission line 45) affects the normal second system in some way.

For example, if the transmission line 45 of the first system is short-circuited, the voltage level of the synchronizing pulse $S_{sync1}$ to be supplied to the first digital torque sensor 13a through the transmission line 45 decreases significantly as indicated by a long dashed double-short dashed line in an upper part of FIG. 3. Then, the voltage level of the synchronizing pulse $S_{sync2}$ to be supplied to the second digital torque sensor 13b through the transmission line 55 also decreases along with the decrease in the voltage level of the synchronizing pulse $S_{sync1}$ as indicated by a long dashed double-short dashed line in a lower part of FIG. 3. Therefore, there is a possibility that an appropriate voltage level cannot be secured for the synchronizing pulse $S_{sync2}$ of the normal system.

In this embodiment, if an overcurrent is generated in the transmission line 45 of the first system, the switch 43 of the abnormal first system is turned OFF. Thus, it is possible to reduce the occurrence of the case where the voltage level of the synchronizing pulse $S_{sync2}$ of the normal second system decreases along with the decrease in the voltage level of the synchronizing pulse $S_{sync1}$ of the first system. That is, it is possible to reduce the occurrence of a case where the operation of the second digital torque sensor 13b of the normal system is affected by the abnormal first system. Accordingly, the second digital torque sensor 13b of the normal system can appropriately continue the operation.

If an abnormality such as a short circuit occurs in the transmission line 55 of the second system, the driver 52 switches the switch 53 from ON to OFF. Thus, it is possible to reduce the occurrence of a case where the abnormality occurring in the second system (short circuit in the transmission line 55) affects the normal first system in some way. Accordingly, the first digital torque sensor 13a of the normal system can appropriately continue the operation.

According to this embodiment, the following effects can be attained. The redundant (duplicated) interface circuit 22 uses the sync-pulse power supply circuit 33 common to the first receiver 34 and the second receiver 35. Therefore, the size (chip area) of the interface circuit 22 can be reduced as compared to the case where separate sync-pulse power supply circuits 33 are used for the first receiver 34 and the second receiver 35. Specifically, the size of the interface circuit 22 can be reduced by an amount corresponding to the chip area of at least one sync-pulse power supply circuit. Further, the size of the ECU 11 can be reduced depending on the degree of size reduction of the interface circuit 22.

The first receiver 34 includes the switch 43 configured to interrupt the supply of the voltage $V_{sync}$ from the sync-pulse power supply circuit 33 to the driver 42. The second receiver 35 includes the switch 53 configured to interrupt the supply of the voltage $V_{sync}$ from the sync-pulse power supply circuit 33 to the driver 52. For example, when an overcurrent is detected as an abnormality, the driver 42 or 52 turns OFF the corresponding switch 43 or 53. Therefore, it is possible to reduce the occurrence of a case where the abnormality such as the overcurrent affects the operation of the digital torque sensor of the normal system in some way. Thus, the digital torque sensor of the normal system can continue the operation. Accordingly, it is possible to meet the demand for the redundancy in the interface circuit 22 and furthermore the ECU 11.

When PSI5 is employed as the communication standard between the digital torque sensor and the receiver, it is necessary to provide two types of power supply circuit (sensor power supply circuit and sync-pulse power supply circuit) in the interface circuit. When the interface circuit is provided with redundancy, it is likely that an increase in the circuit area along with the redundancy is perceived as a problem. Thus, when PSI5 is employed as the communication standard between the digital torque sensor and the receiver and when the interface circuit is provided with redundancy, it is suitable to employ the configuration of the interface circuit 22 of this embodiment, that is, the configuration in which the same sync-pulse power supply circuit 33 is shared by the receivers (34, 35) of two systems.

The plurality of electronic circuits that constitute the interface circuit 22 (first sensor power supply circuit 31, second sensor power supply circuit 32, sync-pulse power supply circuit 33, first receiver 34, and second receiver 35) are integrated into a single IC chip. Therefore, the interface circuit 22 can be made compact in size. Further, the interface circuit 22 can be distributed alone.

The interface circuit 22 is suited to the ECU 11 mounted on the vehicle. In the vehicle, downsizing or space saving of various components including the ECU 11 is desired from the viewpoint of securing installation spaces. According to this embodiment, the size of the ECU 11 can be reduced by an amount corresponding to the size reduction of the interface circuit 22.

This embodiment may be modified as follows. The switch 43 may be provided as a component that is independent and separate from the first receiver 34. In this case, the switch 43 is provided, for example, between the first receiver 34 and the sync-pulse power supply circuit 33 on the transmission line 46. Similarly to the switch 43, the switch 53 may be provided as a component that is independent and separate from the second receiver 35. In this case, the switch 53 is provided, for example, between the second receiver 35 and the sync-pulse power supply circuit 33 on the transmission line 56. Further, ON/OFF control for the switches 43 and 53 may be performed by the drivers 42 and 52 or by the microcomputer 21.

Depending on product specifications or the like, the interface circuit 22 may employ a configuration without the switches 43 and 53. Even in this case, the redundancy of functions can be achieved while suppressing the increase in the size of the interface circuit 22.

The plurality of electronic circuits that constitute the interface circuit 22 (first sensor power supply circuit 31, second sensor power supply circuit 32, sync-pulse power supply circuit 33, first receiver 34, and second receiver 35) need not essentially be integrated into a single IC chip.

The interface circuit 22 can support not only the digital sensors but also analog sensors. For example, the interface circuit 22 determines which type of sensor is used based on a type signal supplied from the microcomputer 21 (information indicating the types of the sensors in use). The interface circuit 22 has a function of operating or stopping the sync-pulse power supply circuit 33 and the receiver circuits 44 and 54 depending on the types of the sensors in use. The first sensor power supply circuit 31 and the second sensor power supply circuit 32 can switch the voltages to be generated between voltages suited to the digital sensors and voltages suited to the analog sensors depending on the types of the sensors in use. When the analog sensors are used in place of the digital sensors, the sync-pulse power supply circuit 33 and the receiver circuits 44 and 54, which are necessary to execute communication based on PSI5, are kept in a state in which the operations are stopped. Thus, the same interface circuit 22 and furthermore the same ECU 11 can be used irrespective of whether the digital sensors are used or the analog sensors are used. The digital sensor and the analog sensor may be used in combination. The communication standard may also be a standard other than PSI5 (for example, Single Edge Nibble Transmission (SENT)).

The control target of the ECU 11 is not limited to the motor 12 of the electric power steering system. The control target may be a motor configured to apply a torque (steering operation force) to a steering operation mechanism of a steer-by-wire system. Further, the ECU 11 may be used as a control apparatus for various on-board systems such as an airbag system. In this case, the digital sensor to be used is not limited to the digital torque sensor. For example, when the control target of the ECU 11 is the airbag system, a collision sensor configured to detect collision of the vehicle is used as the digital sensor.

The interface circuit 22 or the ECU 11 is applicable to various technical fields. For example, the interface circuit 22 or the ECU 11 may be mounted on a machine tool in addition to the vehicle. Further, the control target of the ECU 11 is not limited to the motor 12. The ECU 11 may be used as a control apparatus for various electric actuators depending on purposes.

What is claimed is:

1. A sensor information output apparatus comprising:
   a plurality of first power supply circuits configured to generate operating voltages of digital sensors of a plurality of systems, wherein a number of the plurality of the first power supply circuits is equal to a number of the plurality of the systems, and the digital sensors are configured to generate electric signals based on a physical amount of a detection target;
   a single second power supply circuit configured to generate a signal voltage for synchronizing signals, the synchronizing signals being periodically supplied to the digital sensors;
   a plurality of receivers configured to supply the digital sensors with the synchronizing signals including the operating voltages generated by the plurality of the first power supply circuits and the signal voltage generated by the single second power supply circuit, wherein a number of the receivers is equal to the number of the plurality of the systems, the digital sensors are configured to supply the electric signals to an external circuit as sensor information, and the electric signals are supplied from the digital sensors in response to the synchronizing signals; and
   switches configured to interrupt, when an abnormality occurs in one of transmission lines between the digital sensors and the receivers, supply of the signal voltage to a receiver of a system in which the abnormality occurs among the receivers of the plurality of the systems.

2. The sensor information output apparatus according to claim 1, wherein Peripheral Sensor Interface 5 is employed as communication standards between the digital sensors and the receivers.

3. The sensor information output apparatus according to claim 1, wherein the plurality of the first power supply circuits, the single second power supply circuit, and the receivers are integrated into a single integrated circuit chip.

4. A vehicle control apparatus comprising:
   a sensor information output apparatus including a plurality of first power supply circuits, a single second power supply circuit, a plurality of receivers, and switches,
      the plurality of the first power supply circuits being configured to generate operating voltages of digital sensors of a plurality of systems, wherein a number of the plurality of the first power supply circuits is equal to a number of the plurality of the systems, and the digital sensors are configured to generate electric signals based on a physical amount of a detection target,
      the single second power supply circuit being configured to generate a signal voltage for synchronizing signals, the synchronizing signals being periodically supplied to the digital sensors,
      the receivers being configured to supply the digital sensors with the synchronizing signals including the operating voltages generated by the plurality of the first power supply circuits and the signal voltage generated by the single second power supply circuit, wherein a number of the receivers is equal to the number of the plurality of the systems, the digital sensors are configured to supply the electric signals to an external circuit as sensor information, and the electric signals are supplied from the digital sensors in response to the synchronizing signals,
      the switches being configured to interrupt, when an abnormality occurs in one of transmission lines between the digital sensors and the receivers, supply of the signal voltage to a receiver of a system in which the abnormality occurs among the receivers of the plurality of the systems; and
   a control circuit, which is the external circuit configured to control a control target based on the sensor information acquired through the sensor information output apparatus.

* * * * *